United States Patent [19]
Fujioka et al.

[11] Patent Number: 5,224,338
[45] Date of Patent: Jul. 6, 1993

[54] GASIFYING COMBUSTION METHOD AND GASIFYING POWER GENERATION METHOD

[75] Inventors: Yuichi Fujioka; Tokuda Kimishiro; Toshimitsu Ichinose, all of Nagasaki; Fumiya Nakashima, Tokyo, all of Japan

[73] Assignee: Mitsubishi Jukogyo Kabushiki Kaisha, Tokyo, Japan

[21] Appl. No.: 734,697

[22] Filed: Jul. 23, 1991

[30] Foreign Application Priority Data

Jul. 23, 1990 [JP] Japan ................ 2-193034
Sep. 4, 1990 [JP] Japan ................ 2-232378

[51] Int. Cl.⁵ ............................... F02G 3/00
[52] U.S. Cl. ...................... 60/39.02; 60/39.182
[58] Field of Search ............ 60/39.182, 39.02; 110/229, 245

[56] References Cited

U.S. PATENT DOCUMENTS

| | | |
|---|---|---|
| 3,847,563 | 11/1974 | Archer et al. |
| 4,026,679 | 5/1977 | Collin |
| 4,051,791 | 10/1977 | Wormser ............... 110/347 |
| 4,386,198 | 1/1991 | Naito et al. ........... 110/190 |
| 4,444,007 | 4/1984 | Mitchell et al. ....... 60/39.182 |
| 4,446,694 | 5/1984 | Walton .................. 60/39.182 |

FOREIGN PATENT DOCUMENTS

| | | |
|---|---|---|
| 0008469 | 3/1980 | European Pat. Off. |
| 0062363 | 10/1982 | European Pat. Off. |
| 3642619 | 6/1988 | Fed. Rep. of Germany |
| 2167946 | 8/1973 | France |

Primary Examiner—Richard A. Bertsch
Assistant Examiner—Timothy S. Thorpe
Attorney, Agent, or Firm—Wenderoth, Lind & Ponack

[57] ABSTRACT

Fuel, desulfurizing agent and air are fed into a fluidized bed gasification furnace so that part of the fuel is gasified. The produced combustible gas is led into a combustor. Residual fuel not gasified within the fluidized bed gasification furnace is led to a fluidized bed combustion furnace jointly with the desulfurizing agent to burn it with air fed separately to the combustion furnace. Then produced combustion gas is led into the combustor, in which the combustible gas is burnt with the combustion gas and air fed seperately to the combustor. The amounts of air fed to the respective furnaces and the combustor are individually regulated. A gasifying power generation method includes, in addition to the abovementioned steps of the gasifying combustion method, the steps of driving a gas turbine by the combustion gas produced by the combustor, driving a steam turbine by steam generated by the combustion gas, and rotating electric generators by the respective turbines to carry out power generation.

6 Claims, 5 Drawing Sheets

GASIFYING COMBUSTION METHOD AND GASIFYING POWER GENERATION METHOD

BACKGROUND OF THE INVENTION

1. Field of the Invention

The present invention relates to a gasifying combustion method for gasifying crude fuel such as heavy oil, coal and the like so as to be able to use it as working fuel in a combined cycle making use of, for instance, a gas turbine, and also relates to a gasifying power generation method.

2. Description of the Prior Art

Figure 4:
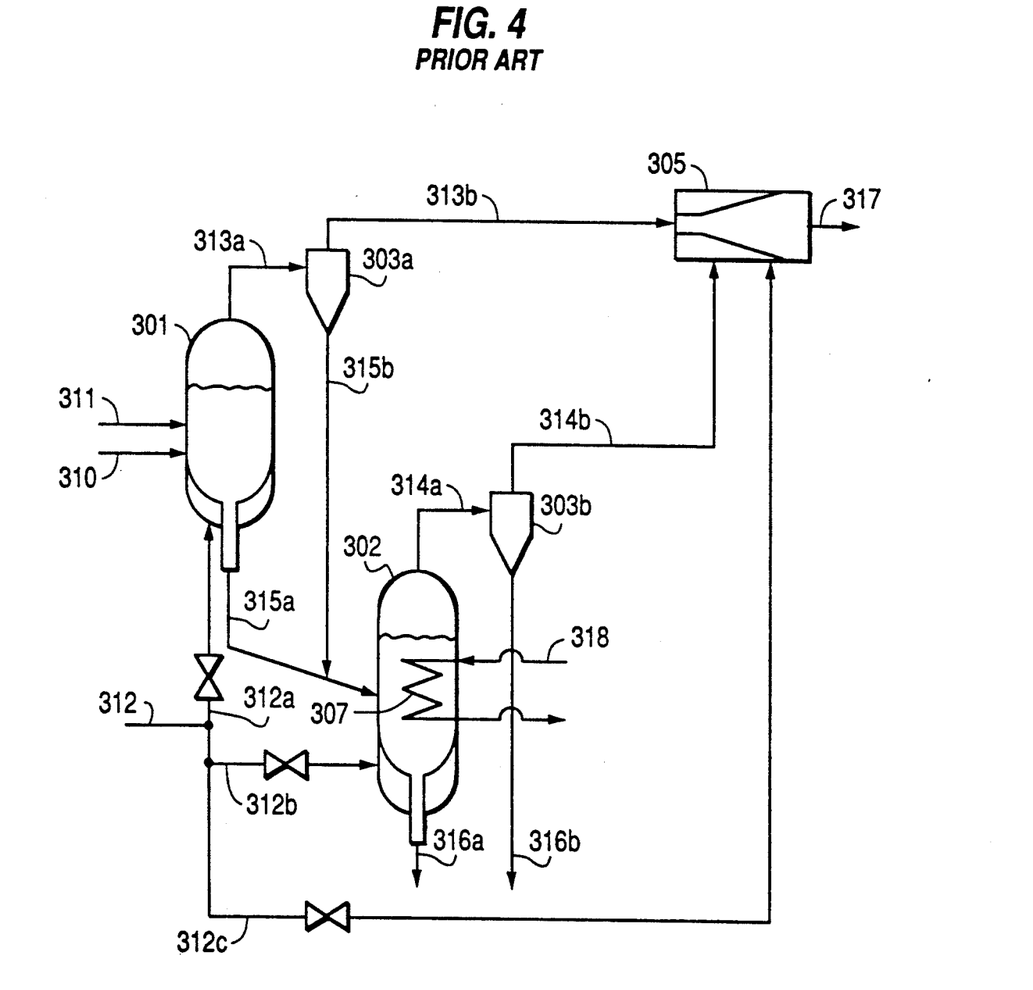
FIG. 4 is a system diagram of a gasifying combustion apparatus in the prior art.

FIG. 4 is a system diagram showing one example of an apparatus for practicing a gasifying combustion method in the prior art.

With reference to this figure, at first coal 310 and desulfurizing agent 311 are fed to a fluidized bed gasification furnace 301. In this fluidized bed gasification furnace 301, coal 310 is gasified, and a sulfur component in the coal is fixed by the desulfurizing agent 311 as calcium sulfide (CaS). Combustible gas 313a produced by gasification of the coal 310 is dedusted in a dust removing device 303a. Combustible gas 313b after dedusting is introduced to a secondary combustor 305.

On the other hand, a mixture 315a of char produced from the coal not gasified in the fluidized bed gasification furnace 301 and the desulfurizing agent, and a mixture 315b of char and the desulfurizing agent collected in the dust removing device 303a, are fed to a fluidized bed combustion furnace 302. To this fluidized bed combustion furnace 302 is also fed air 312b, and a combustion reaction of char and a reaction of calcium sulfide being oxidized and transformed into gypsum (CaSO$_4$) arise. In addition, within the fluidized bed of the fluidized bed combustion furnace 302 is installed a heat exchanger 307 and a fluidized bed temperature is regulated by cooling with steam or water 318.

Combustion gas 314a produced in the fluidized bed combustion furnace 302 is dedusted by a dust removing device 303b. Combustion gas 314b after dedusting is introduced to the above-mentioned secondary combustor 305. In the secondary combustor 305, the combustible gas 313b produced in the fluidized bed gasification furnace 301 is burnt by residual oxygen in the combustion gas 314b introduced from the fluidized bed combustion furnace 302 and separately fed air 312c, and produced combustion gas 317 is sent to, for example, a gas turbine (not shown).

An ash component in the coal 310 and the desulfurizing agent 311 after desulfurization are removed as extraction ash 316a from the bottom of the fluidized bed combustion furnace 302, and as exhaust ash 316b from the dust removing device 303b, respectively, and discharged to the outside of the system.

In the case where it is intended to increase the amount of the combustion gas 317, the amounts of coal 310 and the air 312a fed to the fluidized bed gasification furnace 301 are increased. Then, the char and the desulfurizing agent 315a sent from the fluidized bed gasification furnace 301 to the fluidized bed combustion furnace 302, would increase. Hence, according to the increased amount of the char entering the fluidized bed combustion furnace 302, the feed amount of the air 312b is increased. In the case where it is intended to decrease the amount of the combustion gas 317, the gas 310 and the air 312a fed to the fluidized bed gasification furnace 301 are decreased, and thereafter, according to the decreased amount of the char entering the fluidized bed combustion furnace 302, the feed amount of the air 312b is decreased.

Next, one example of an electric power generation method making use of heavy oil in the prior art will be described with reference to FIG. 5.

Heavy oil 601 is pressurized by a pressurizing pump 502 and then fed to a gasification furnace 525. In the gasification furnace 525, a part of the fuel 601 is burnt with pressurized air 607, and carbon is gasified and transformed into gaseous fuel by making use of the combustion as a heat source. Combustible gas 608 produced in the gasification furnace 525 is cooled to 350° C.–450° C. by heat-exchange with water 610 in a heat-exchanger 524. The combustible gas 608 after cooling is subjected to dedusting treatment in a porous filter 505, becomes a gas having a dust concentration of about 1 mg/Nm$^3$ or less, and it is sent to a desulfurizing device 526 in which H$_2$S in the combustible gas 608 is removed by making use of desulfurizing agent of the iron oxide group. Combustible gas 608a after dedusting and desulfurization is fed to a combustor 507, then it is burnt with pressurized air 607c and becomes combustion gas 609, its temperature is held at 1150° C.–1300° C., and it is fed to a gas turbine 509 to drive the same gas turbine 509.

The pressure of the combustion gas 609 fed to the gas turbine 509 is determined so that a sending end efficiency of the power generation system may become maximum once the temperature of the combustion gas 609 is determined. Energy of the combustion gas 609 is given to the gas turbine 509, and electric power generation is effected by driving a generator 517 with that energy. Combustion gas 609a at the outlet of the gas turbine 609 has its heat transmitted to water 610 in an exhaust gas boiler 510, and after its temperature has lowered to 120° C.–130° C., it is exhausted to the atmosphere through a stack 514.

Within the above-mentioned exhaust gas boiler 510 is provided a heat-exchanger 521 to which water 610 having cooled the combustible gas 608 is introduced, and in the exhaust, gas boiler 510, thermal energy is transmitted from the abovementioned combustion gas 609a to the water 610 having been heated by the combustible gas 608 in the heat-exchanger 524, and the water 610 is transformed into steam 611. Energy of the steam 611 is given to a steam turbine 511, and electric power generation is effected by driving a generator 518 with that energy.

Unburnt carbon and an ash component produced within the gasification furnace 525 are exhausted from the gasification furnace 525 through a piping 612 and hoppers 515c and 516c to the outside of the system as exhaust ash 605a. In addition, soot and dust collected from the combustible gas 608 by means of the porous filter 505 are exhausted through a piping 617 and hoppers 515d and 516d to the outside of the system as exhaust ash 605b.

In addition, reference numeral 508 designates a compressor directly connected to the gas turbine 509, and the compressor 508 is adapted to pressurize intake air 603 and feed the pressurized intake air 607c to the combustor 507 and feed the pressurized air 607 to the above-mentioned gasification furnace 525.

However, in the known gasifying combustion method in the prior art illustrated in FIG. 4, the heat-exchanger 307 for controlling a combustion temperature is installed in the fluidized bed combustion furnace 302. Accordingly, a part of the energy of the fuel is collected directly by a steam turbine without being sent to the gas turbine in the form of sensible heat of the combustion gas, and so, there was a problem that a power generation efficiency is lowered by the amount corresponding to the sensible heat which wont't be used by the gas turbine.

Also, in this known method in the prior art, as the amount of the air 312b in the fluidized bed combustion furnace 302 is regulated according to an increase or decrease of the exhaust char from the fluidized bed gasification furnace 301, the speed in which the amount of the combustion gas 317 can be varied is slow.

Furthermore, since variations in the amount of transfer of char between the fluidized bed gasification furnace 301 and the fluidized bed combustion bed 302 is regulated by a distributing ratio of a fixed amount of air 312 between the fluidized bed gasification furnace and the fluidized bed combustion furnace 302 in order to maintain the temperature of the combustion gas 317 at a constant value, there was a shortcoming in that in varying the amount of the combustion gas 317, the respective reactors (furnaces) would become very complicated to control.

Figure 5:
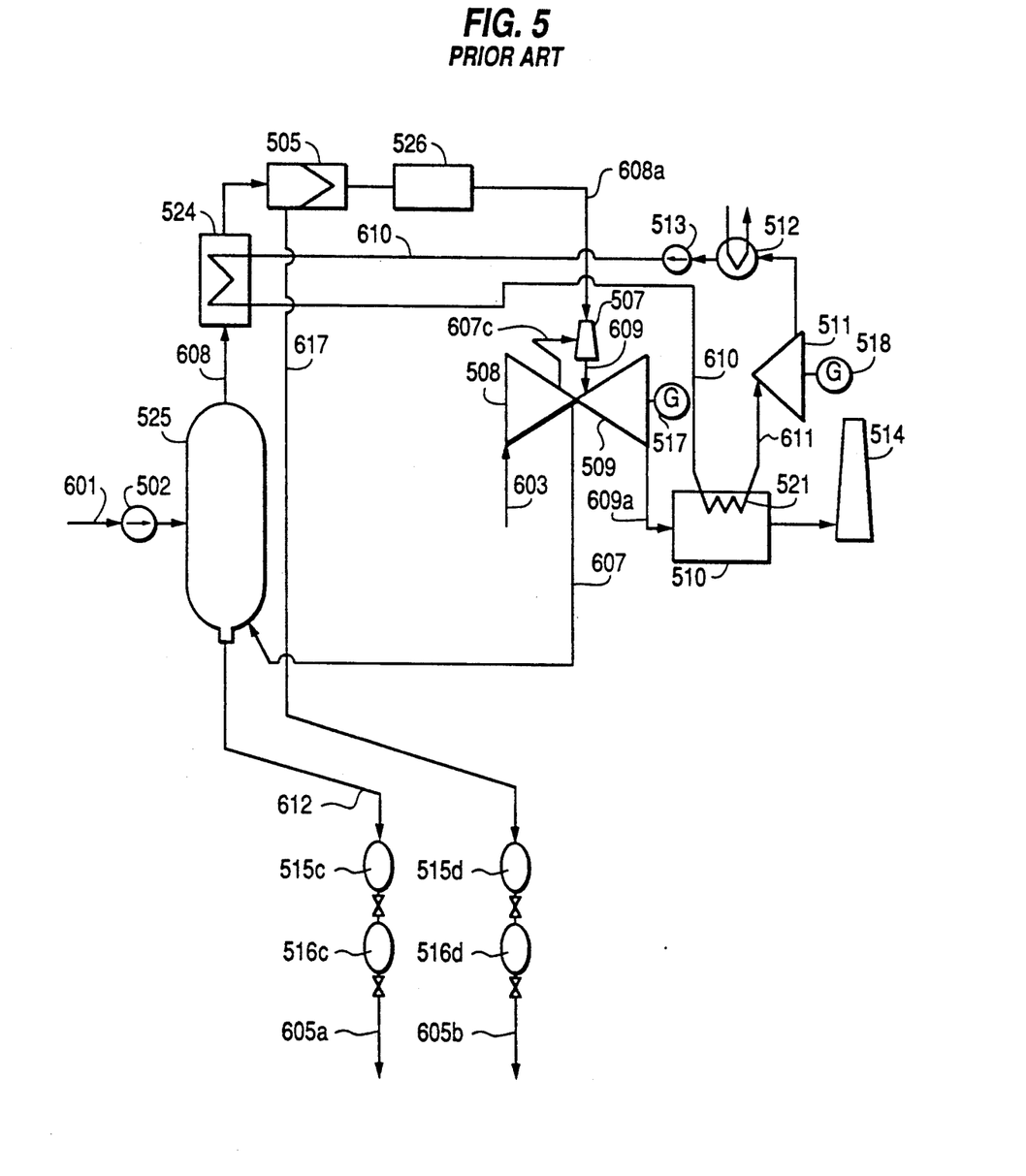
FIG. 5 is a system diagram of a gasifying power plant in the prior art.

In addition, in the power generation method in the prior art illustrated in FIG. 5, since iron oxides were employed as the desulfurizing agent to be used in the desulfurizing device, the desulfurizing temperature was most preferably 400° C.–450° C. To that end, it was necessary to cool the combustible gas produced in the gasification furnace to 400° C.–450° C. Because of the fact that it was necessary to cool the combustible gas at the outlet of the gasification furnace to 400° C.–450° C. as described above, a part of the thermal energy of the combustible gas produced in the gasification furnace is not used as energy for driving a gas turbine but is used to heat the steam for driving a steam turbine. Thus, the power generation efficiency of the prior art combined electric power generation plant, in which a gas turbine and a steam turbine are used in combination, cannot, theoretically, be made maximum.

SUMMARY OF THE INVENTION

It is therefore one object of the present invention to provide a gasifying combustion method and a gasifying power generation method which can resolve the above-described problems in the prior art.

According to one aspect of the present invention, fluidized bed gasification furnace is directly led to the combustor without being cooled, so that the temperature of the combustion gas produced in the combustor is raised, and the amount of combustion gas of the combustor can be varied simply according to load requirements.

Also, in the gasifying power generation method according to the present invention, since a gas turbine is driven by the combustion gas at a high temperature that was produced in the combustor in the above-described manner, and a steam turbine is driven by steam produced by the combustion gas coming out of the gas turbine, a thermal efficiency of the entire plant is improved.

The above-mentioned and other objects, features and advantages of the present invention will become apparent by reference to the following description of preferred embodiments of the invention taken in conjunction with the accompanying drawings.

DETAILED DESCRIPTION OF THE PREFERRED EMBODIMENTS

Figure 1:
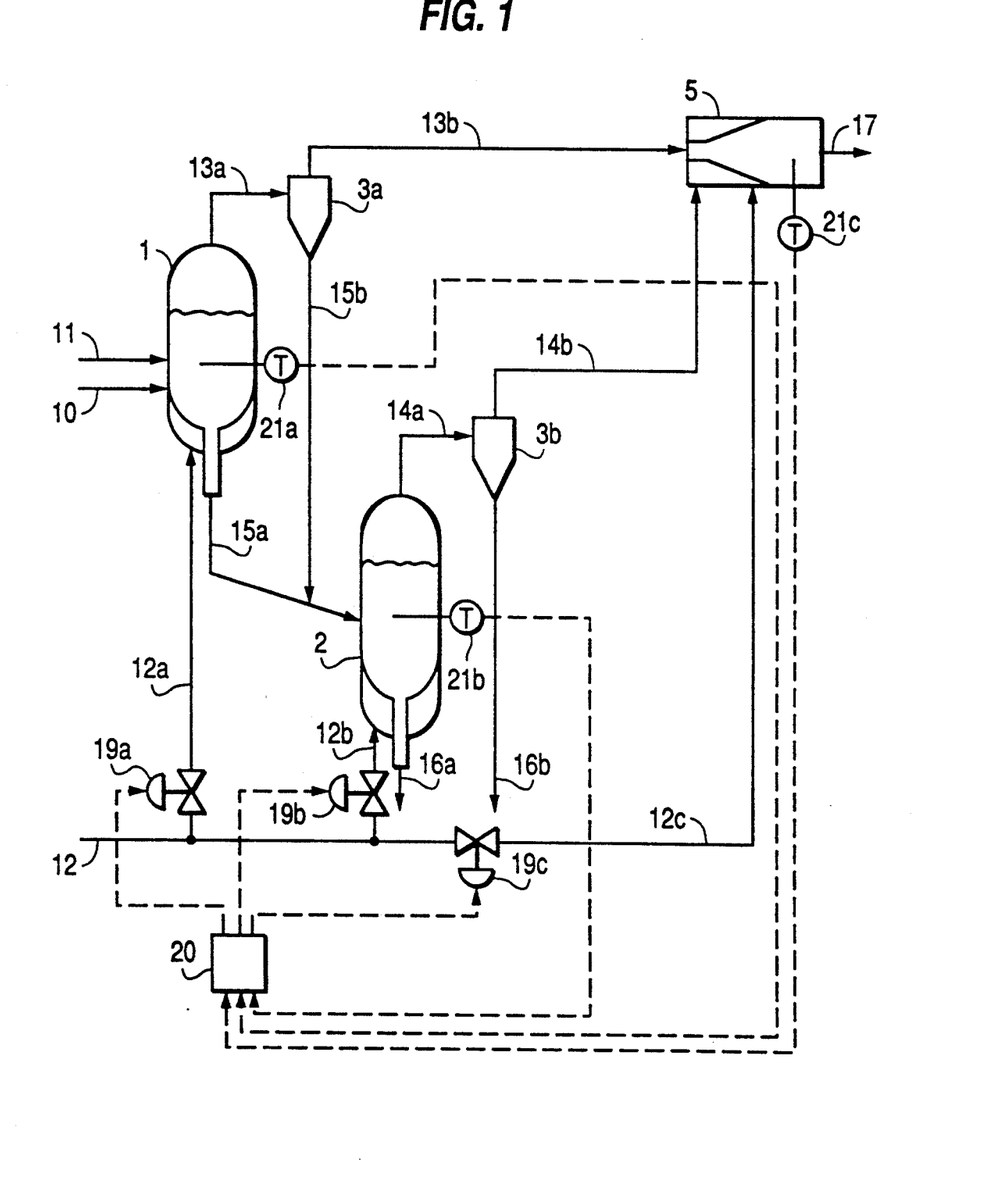
FIG. 1 is a system diagram of an apparatus used for practicing a first preferred embodiment of a method according to the present invention.

A first preferred embodiment of the method according to the present invention is effected by the apparatus shown in FIG. 1.

In this apparatus, coal 10 and desulfurizing agent are fed to a fluidized bed gasification furnace 1. In this fluidized bed gasification furnace 1, the coal 10 is gasified and a sulfur component in the coal is fixed as calcium sulfide by the desulfurizing agent 11. Combustible gas 13a produced by gasification of the coal 10 is dedusted by a dust removing device 3a. The combustible gas 13b after dedusting is introduced into a combustor 5.

On the other hand, a mixture 15a of char produced from the coal not gasified in the fluidized bed gasification furnace 1 and the desulfurizing agent, and a mixture 15b of char collected by the dust removing device 3a and desulfurizing agent, are fed to a fluidized bed combustion furnace 2. To this fluidized bed combustion furnace 2 is also fed air 12b, and a combustion reaction of the char as well as a reaction of oxidizing calcium sulfide and transforming it to gypsum proceed.

Combustion gas 14a produced in the fluidized bed combustion furnace 2 is dedusted by a dust removing device 3b. Combustion gas 14b after dedusting is introduced to the combustor 5. In the combustor 5, the combustible gas 13b is burnt with residual oxygen in the combustion gas 14b and with air 12c, and produced combustion gas 17 is sent to, for example, a gas turbine (not shown).

An ash component in the coal 10 and the desulfurizing agent 11 after desulfurization are discharged to the outside of the system from the bottom of the fluidized bed combustion furnace 2 as extraction ash 16a, and from the dust removing device 3b as exhaust ash 16b.

The fluidized bed temperature of the fluidized bed gasification furnace 1 is selected, although it is different depending upon a kind of coal, at 700° C.–1000° C. as an optimum temperature for a desulfurization reaction to occur efficiently and for a gasification reaction of coal also to proceed. The fluidized bed temperature of the fluidized bed combustion furnace 2 is selected at 800° C.–1050° C. depending upon a kind of coal so that a reaction of calcium sulfide being oxidized efficiently into gypsum may proceed and that a combustion efficiency of char may rise.

In the illustrated embodiment, the temperatures of the fluidized bed gasification furnace 1, the fluidized bed combustion furnace 2 and the combustor 5 are detected, respectively, by temperature detectors 21a, 21b and 21c, flow rates of the air 12a, 12b and 12c to be fed to these reactors 1, 2 and 5 are calculated by a controller 20 on the basis of this temperature information and the value of the feed rate of the coal 10, and the respective flow rates are independently regulated by respectively controlling flow rate regulating valves 19a, 19b and 19c.

In the case of increasing an amount of combustion gas 17 at the outlet of the combustor 5, the amount of the combustion gas 17 is quickly increased by simultaneously increasing the coal 10 and the air 12a fed to the fluidized bed gasification furnace 1 and the air 12c fed to the combustor 5. And thereafter, if the amount of char sent from the fluidized bed gasification furnace to the fluidized bed combustion furnace 2 has been increased, the air 12b fed to the fluidized bed combustion furnace 2 is increased and the air 12c fed to the combustor 5 is decreased. In the case of decreasing the amount of the combustion gas 17 at the outlet of the combustor 5, the coal 10 and the air 12a fed to the fluidized bed gasification furnace 1 and the air 12c fed to the combustor 5 are simultaneously decreased, and thereafter, if the amount of char sent from the fluidized bed gasification furnace 1 to the fluidized bed combustion furnace 2 has been decreased, the air 12b fed to the fluidized bed combustion furnace 2 is decreased, and the air 12c fed to the combustor 5 is increased. As described above, in the illustrated embodiment, the amount of the combustion gas 17 at the outlet of the combustor 5 can be varied easily and quickly.

In the illustrated embodiment also, since a heat-exchanger as used in the prior art (designated by reference numeral 307 in FIG. 4) is not present within the fluidized bed combustion furnace 2 and cooling by a large amount of steam or water is not affected, chemical energy possessed by combustion gas can be entirely transformed into thermal energy. An since this combustion gas is fed to a gas turbine, an electric power generation efficiency of a combined cycle becomes higher than that in the prior art. Also, since there is no need to install a heat-exchanger within the fluidized bed combustion furnace, 2, the construction cost of a fluidized bed combustion furnace becomes less expensive.

Figure 2:
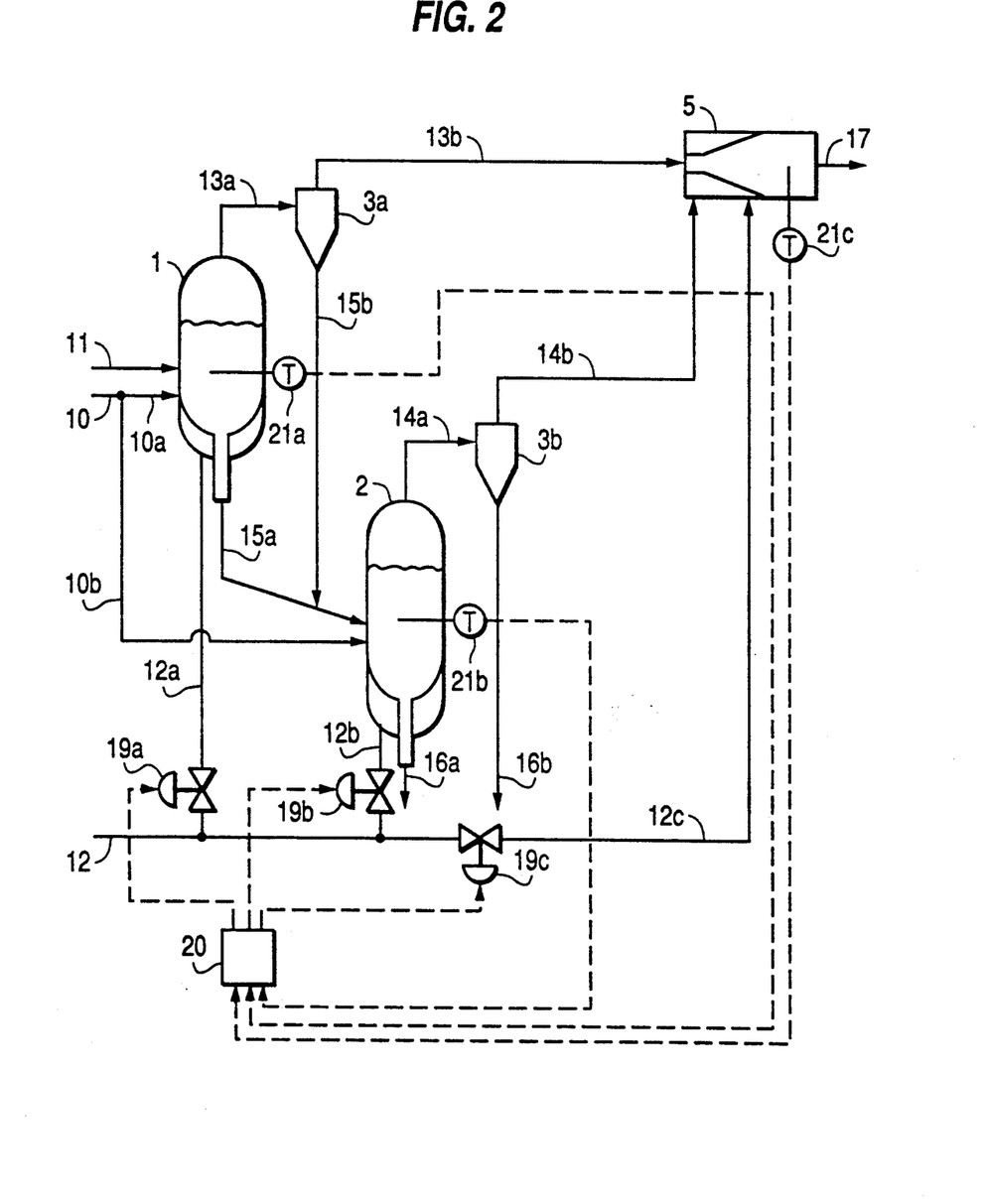
FIG. 2 is a system diagram of an apparatus used for practicing a second preferred embodiment of a method according to the present invention.

FIG. 2 is a system diagram of an apparatus used for practicing a second preferred embodiment of the present invention. In the illustrated embodiment, coal 10b is directly fed not only to a fluidized bed gasification furnace 1 but also to a fluidized bed combustion furnace 2.

Then, in the case of varying a load, an amount of combustion gas at an outlet of a combustor 5 can be varied quickly through the following procedure. For instance, in the case of increasing a load, the amount of combustion gas 17 is quickly increased by simultaneously increasing the amounts of coal 10a and air 12a fed to the fluidized bed gasification furnace 1 and of coal 10b and air 12b fed to the fluidized bed combustion furnace 2. An thereafter, according to the increase in an amount of char sent from the fluidized bed gasification furnace 1 to the fluidized bed combustion furnace 2, the coal 10b fed to the fluidized bed combustion furnace 2 is decreased.

In the illustrated embodiment, also upon start up of the apparatus, by simultaneously feeding the coal 10a and 10b to the fluidized bed gasification furnace 1 and the fluidized bed combustion furnace 2 in the above-described manner, the furnaces can be warmed up simultaneously.

Figure 3:
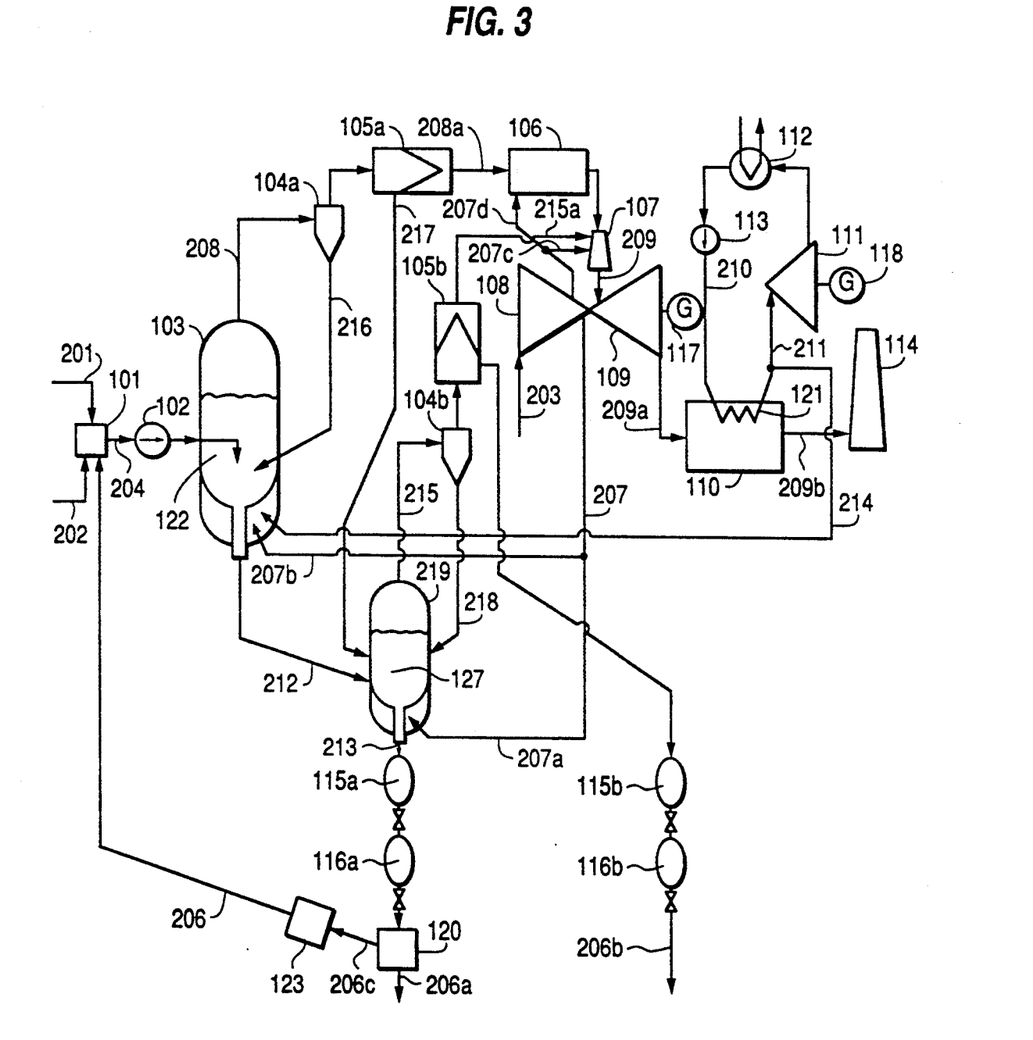
FIG. 3 is a system diagram of an apparatus used for practicing to a third preferred embodiment of a method according to the present invention.

FIG. 3 is a system diagram of an apparatus used for practicing a third preferred embodiment of the method according to the present invention.

With reference to FIG. 3, heavy oil 201, desulfurizing agent 202 and recycled desulfurizing agent 206 are mixed into slurry in a mixer 101, and it is pressurized from a normal pressure condition by a pressurizing pump 102 and fed to a pressure-fluidized bed gasification furnace 103. As the desulfurizing agent 202, calcium compounds such as limestone, dolomite and the like are used. A gasification pressure in the pressure-fluidized bed gasification furnace 103 is normally present at 15-30 atm, although it is determined according to an operating pressure of a downstream gas turbine 109. Within the pressure-fluidized bed gasification furnace 103, particles of the desulfurizing agent 202 are fluidized by air 207b fed from the bottom of the same furnace 103 and would form a fluidized bed 122. The temperature of the fluidized bed 122 is set in the range of 700° C.-1000° C. In the fluidized bed 122, simultaneously with the thermal decomposition of the heavy oil 201, a gasifying reaction in which carbon in the heavy oil reacts with $CO_2$ and produces CO, and a combustion reaction of the air 207b and a thermal decomposition product of the heavy oil 201 as well as the air 207b and CO, an S-component in the heavy oil reacts with the above-mentioned desulfurizing agent 202 and 206 to be fixed in the desulfurizing agent as CaS. In addition, the above-mentioned desulfurizing agent adsorbs alkali metals such as V, Na, K and the like in the heavy oil and prevents these components from being contained in the produced gas. In order to improve controllability of the temperature of the fluidized bed 122 and the suppress the production of unburnt carbon, it is preferable to feed a small amount of steam 214 to the pressure-fluidized bed gasification furnace.

In the pressure-fluidized bed gasification furnace 103, the temperature is set at 700° C.-1000° C. Hence, 40% or more of carbon in the fed heavy oil 201 is gasified into combustion gas 208, and after desulfurizing agent particles contained in the combustion gas 208 have been removed in a cyclone 104a, the combustion gas 208 enters a porous filter 105a. Particles 216 of desulfurizing agent and the like collected in the cyclone 104a are returned to the fluidized bed 122, but depending upon the amount of the particles 216, some of them could be sent to a fluidized bed combustion furnace 219 which will be described later.

Particles 217 of desulfurizing agent or the like in the combustible gas 208 collected by the porous filter 105a are sent to the fluidized bed combustion furnace 219 which will be described later.

In order to maintain the height of the fluidized bed 122 within the above-mentioned fluidized bed gasification furnace 103 at a constant value, particles 212 of the desulfurizing agent and an unburnt component are sent from the pressure-fluidized bed gasification furnace 103 to the fluidized bed combustion furnace 219 which will be described later.

Combustible gas 208a having passed through the porous filter 105a and having a dust content greatly reduced is partly burnt in ammonia decomposition column 106 with air pressurized by a compressor 108 and raises the temperature of the combustible gas 208a to about 900° C.-1000° C., and subsequently by making it pass through catalyst disposed within the same ammonia decomposition column 106 and containing nickel, ammonia ($NH_3$), HCN and the like in the combustible gas 208a are decomposed into nitrogen ($N_2$). The temperature of the combustible gas 208a is determined depending upon the durability of the $H_2S$ and catalyst contained in the combustible gas. The combustible gas 208a is sent from the ammonia decomposition column 106 to a combustor 107, and in the combustor 107 it is perfectly burnt with air 207c fed from the compressor 108 and combustion gas 215a of the fluidized bed combustion furnace 219 which will be described later. The temperature of the combustion gas 209 becomes 1250° C.–1500° C., and the combustion gas 209 is introduced to the gas turbine 109. The temperature of this combustion gas 209 is determined depending upon materials and a structure of the gas turbine 109, and the higher the temperature is, the greater the power generation efficiency. On the other hand, a life of the gas turbine is shortened, and so, an optimum temperature is selected. The combustion gas 209 gives its energy to the gas turbine 109 to rotate it, and the energy is converted into electricity by a generator 117.

Combustion gas 209a having passed through the gas turbine 109 and having its pressure reduced to approximately the normal pressure is introduced to a waste heat boiler 110. Within the waste heat boiler 110, sensible heat of the combustion gas 209a is transmitted to water 210 in a heat-exchanger 121. The water 210 is heated in the heat-exchanger 121 and evaporates into steam 211. Energy received by steam 211 is given to a steam turbine 111 to rotate it, and as a result of the same steam turbine driving a generator 118, the energy is eventually converted into electricity.

The steam 211 coming out of the steam turbine 111 is condensed into water 210 by a condenser 112, and after pressurized by a pressurizing pump 113, the water 210 is again sent to the heat-exchanger 121.

Within the fluidized bed combustion furnace 219, the fluidized bed 127 is kept in a fluidized condition by introduced air 207a, and the particles 212 of the desulfurizing agent and an unburnt component sent from the pressure-fluidized bed gasification furnace 103 in the above-described manner, are subjected to oxidation of CaS in the particles 212 into $CaSO_4$ and combustion of the unburnt component within the same fluidized bed 127.

In order to convert CaS into $CaSO_4$, the temperature within the fluidized bed combustion furnace 219 is set at 600° C.–1000° C. Desulfurizing agent particles 213 extracted from the bottom of the fluidized bed combustion furnace 219 are introduced to a fractionator 120 via lock hoppers 115a and 116a, and in the fractionator 120, coarse particles having high contents of $CaCO_3$ and CaO are led to a grinder 123 for use as a recycled desulfurizing agent 206c, and the remaining fine particles are exhausted to the outside of the system as exhaust ash 206a. The recycled desulfurizing agent 206 ground into fine particles in the above-described grinder 123 is sent to the previously described mixer 101, and then it is returned to the pressure-fluidized bed gasification furnace 103 as a part of the desulfurizing agent.

On the other hand, the combustion gas having the desulfurizing agent 218 separated therefrom is introduced to a porous filter 105b, and the combustion gas 215b having desulfurizing agent and ash further separated here is introduced into the combustor 107 in the above-described manner. In addition, the ash and the desulfurizing agent collected by the porous filter 105b are exhausted to the outside of the system as exhaust ash 206b via lock hoppers 115b and 116b.

Combustion exhaust gas 209b having passed through the above-described waste heat boiler 110 is dispersed into the atmosphere through a stack 114. This combustion exhaust gas 209b has been desulfurized and also has alkali metals such as Na, K and the like as well as V removed in the pressure-fluidized bed gasification furnace 103 in the above-described manner. In the ammonia decomposition column 106, the combustion gas 209 has also had ammonia ($NH_3$), HCN and the like contained therein decomposed. Thus it can be exhausted from the stack to the atmosphere as cleaned gas having a small content of $NO_x$.

It is to be noted that the above-described compressor 108 is adapted to be driven by the gas turbine 109 through direct connection, it sucks air 203 and compresses it to a high pressure, and it is adapted to send pressurized air 207 to the fluidized bed combustion furnace 219 and the pressure-fluidized bed gasification furnace 103 respectively as air 207a and air 207b as described above, and pressurized air 107c and 107d to the combustor 107 and the ammonia decomposition column 106.

As described above, in the illustrated embodiment, chemical energy possessed by heavy oil 201 is transformed into electric energy, S, V, Na, K and the like in the heavy oil 201 are fixed and absorbed in the exhaust ash 206a and 206b, also $NH_3$, HCN and the like are removed, and N components in the heavy oil 201 can be dispersed into the atmosphere as $N_2$.

Also, in this preferred embodiment, since the pressure-fluidized bed gasification furnace 103 and the fluidized bed combustion furnace 219 are not provided with a heat-exchanger, an inner volume of these furnaces can be made small, and so, start-up as well as load-response are easy. In addition, since produced gases of the respective furnaces 103 and 219 are introduced to a combustor and further to a gas turbine without effecting heat-exchange, a thermal efficiency is improved, and a generating end efficiency can be raised.

While heavy oil is used in this preferred embodiment, in the case of employing coal, it can be utilized similarly as fuel for electric power generation by making use of a lock hopper or by feeding it to the pressure-fluidized bed gasification furnace 103 as water slurry by means of a pressurizing pump.

In this preferred embodiment, in order to transform 40% of carbon in crude fuel as described above, it is desirable to set the fluidized bed gasification furnace temperature to 700° C. or higher, and this fluidized bed gasification furnace temperature can be controlled by regulating an amount of air fed to the same furnace.

While the decomposition of $NH_3$, HCN and the like by a nickel catalyst occurs from about 500° C., practically by making the reaction occur at a temperature of 900° C. or higher, it is possible to prevent poisoning by sulfur contained in gas produced from the catalyst. Accordingly, upon contact of the gas produced from the fluidized bed gasification furnace with catalyst containing nickel, it is desirable to select a temperature of 900° C.14 1100° C.

As will be obvious from the detailed description of the preferred embodiments of the present invention above, in the gasifying combustion method according to the present invention, in the case of gasifying crude fuel such as coal or heavy oil and using it as operating fuel in a combined cycle or the like, gasifying combustion having a good response to load variations and a high efficiency can be realized, and also combustion gas at a high temperature can be produced in a combustor.

Also, in the gasifying power generation method according to the present invention, it is possible to improve a thermal efficiency of a plant by means of high-temperature combustion gas produced in a combustor. Accordingly, to improve a generating end efficiency, and further, start-up and load-response can be facilitated by the fluidized bed gasification furnace and fluidized combustion furnace owing to their relatively small volumes. In this connection, as compared to the case in the prior art where coal gasified gas is desulfurized at 400° C.–450° C., a generating end efficiency when practicing the present invention is greater by about 20%.

While a principle of the present invention has been described above in connection with preferred embodiments of the invention, it is intended that all matter contained in the above description and illustrated in the accompanying drawings shall be interpreted as illustrative of and not as a limitation on the scope of the invention.

What is claimed is:

1. A method of effecting combustion comprising the steps of: feeding fuel, desulfurizing agent and air into a fluidized bed gasification furnace to thereby gasify part of the fuel; leading combustible gas produced in the furnace into a combustor; leading residual fuel not gasified within the fluidized bed gasification furnace from the gasification furnace to a combustion furnace along with desulfuring agent; feeding air to the combustion furnace separately form the residual fuel and the desulfurizing agent and combusting the residual fuel within the combustion furnace with the air fed thereto; leading combustion gas produced in the combustion furnace into the combustor; feeding air into the combustor separately from both the combustible gas and the combustion gas led into the combustor, and burning the combustible gas in the combustor with the combustion gas led into the combustor and the air fed into the combustor; and regulating the temperature within the fluidized bed gasification furnace, the combustion furnace, and the combustor by controlling individually the amounts of the air fed thereto, respectively.

2. A method of effecting combustion as claimed in claim 1, wherein the steps of feeding air into the fluidized bed gasification furnace, the combustion furnace, and the combustor are carried out by feeding air in a single stream, and diverting respective amounts of air from said single stream only towards the fluidized bed gasification furnace, the combustion furnace and the combustor so that the amount of air diverted to said combustor is equal to the total amount of air flowing in said single stream less the amounts of air diverted to the fluidized bed gasification furnace and the combustion furnace.

3. A method effecting combustion as claimed in claim 1, wherein the step of controlling includes sensing the temperatures within the fluidized bed gasification furnace, the combustion furnace and the combustor and regulating the respective amounts of air fed thereinto based on the sensed temperatures.

4. A method effecting combustion as claimed in claim 2, wherein the step of controlling includes sensing the temperatures within the fluidized bed gasification furnace, the combustion furnace and the combustor and regulating the respective amounts of air fed thereinto based on the sensed temperatures.

5. A method of generating power comprising the steps of: feeding fuel, desulfurizing agent, and air into a fluidized bed gasification furnace to thereby gasify part of the fuel; leading combustible gas produced in the furnace into a combustor; leading residual fuel not gasified within the fluidized bed gasification furnace along with the desulfurizing agent from the gasification furnace; feeding air into the residual fuel and the desulfurizing agent once the residual fuel and the desulfurizing agent have been led from the furnace, and burning the residual fuel with the air to produce combustion gas; leading the combustion gas into the combustor; feeding air into the combustor separately from both the combustible gas and the combustion gas, and burning the combustible gas in the combustor with the combustion gas led into the combustor and the air fed into the combustor to thereby produce combustion gas; driving a gas turbine with the combustion gas produced in the combustor; generating steam from combustion gas passing out of the gas turbine; driving a steam turbine with the steam; and rotating electric generators with the respective turbines to generate power.

6. A method of generating power as claimed in claim 5, and further comprising driving an air compressor with the gas turbine to compress a supply of intake air, and wherein the steps of feeding air into the fluidized bed gasification furnace, feeding air into the residual fuel and feeding air into the combustor comprise feeding respective portions of the air compressed by the compressor into the fluidized bed gasification furnace, into the residual fuel and into the combustor, respectively.

* * * * *